US009633113B2

(12) United States Patent
Jain et al.

(10) Patent No.: US 9,633,113 B2
(45) Date of Patent: Apr. 25, 2017

(54) SOCIALIZING VIA SEARCH

(75) Inventors: Alpa Jain, San Jose, CA (US); Anish Das Sarma, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 162 days.

(21) Appl. No.: 12/852,426

(22) Filed: Aug. 6, 2010

(65) Prior Publication Data
US 2012/0036148 A1 Feb. 9, 2012

(51) Int. Cl.
*G06F 17/30* (2006.01)
(52) U.S. Cl.
CPC .... *G06F 17/30864* (2013.01); *G06F 17/3064* (2013.01)
(58) Field of Classification Search
CPC .............. G06F 17/27; G06F 17/30598; G06F 17/30684; G06F 17/30705; G06F 17/3064; G06F 17/30864; G06F 17/30867; G06Q 50/01; G06Q 30/0256; G06Q 30/0631; H04L 12/581; H04L 51/04; H04L 67/22; H04L 12/1822; H04L 65/403; H04N 21/4788; G06N 5/04; G06N 5/02
USPC ........... 707/769, 706, 767; 705/26.7; 706/50
See application file for complete search history.

(56) References Cited

U.S. PATENT DOCUMENTS

| | | | |
|---|---|---|---|
| 2006/0026593 A1* | 2/2006 | Canning | G06F 9/4843 718/100 |
| 2006/0170945 A1* | 8/2006 | Bill | G06F 17/30749 358/1.13 |
| 2006/0195479 A1* | 8/2006 | Spiegelman | G06F 17/30766 |
| 2007/0016585 A1* | 1/2007 | Nickell | G06F 17/30864 |
| 2007/0198459 A1* | 8/2007 | Boone | G06F 17/30716 |
| 2007/0294229 A1* | 12/2007 | Au | G06F 17/30864 |
| 2008/0033930 A1* | 2/2008 | Warren | 707/5 |
| 2008/0320037 A1* | 12/2008 | MacGuire | G06F 17/30896 |
| 2009/0094196 A1* | 4/2009 | Piwowarski | G06F 17/30873 |
| 2009/0172146 A1* | 7/2009 | Bates | G06F 17/30749 709/224 |
| 2009/0177460 A1* | 7/2009 | Huang | G06F 17/2818 704/2 |
| 2010/0306123 A1* | 12/2010 | Cai | G06Q 30/0282 705/347 |
| 2010/0312769 A1* | 12/2010 | Bailey | G06F 17/30705 707/740 |
| 2011/0040846 A1* | 2/2011 | Weinryb et al. | 709/206 |
| 2011/0078156 A1* | 3/2011 | Koss | 707/748 |
| 2011/0119229 A1* | 5/2011 | Jung | G06Q 10/10 707/608 |
| 2011/0246285 A1* | 10/2011 | Ratnaparkhi et al. | 705/14.42 |

(Continued)

OTHER PUBLICATIONS

WordNet, http://wordnet.princeton.edu/, downloaded Nov. 8, 2010, 3 pages.

(Continued)

*Primary Examiner* — Dennis Truong
(74) *Attorney, Agent, or Firm* — Berkeley Law & Technology Group, LLP

(57) ABSTRACT

Implementations of methods, apparatuses, or systems are disclosed to facilitate search related communications. In at least one implementation, a method may include processing search queries based at least in part on one or more search query parameters to identify candidate search queries for an exchange of related communications, wherein candidate search queries originate from different special purpose computing system resources and/or different users.

22 Claims, 5 Drawing Sheets

(56) References Cited

U.S. PATENT DOCUMENTS

2011/0302153 A1* 12/2011 Meretakis et al. ............ 707/722
2012/0166180 A1* 6/2012 Au ........................ G06F 17/274
 704/9
2012/0316962 A1* 12/2012 Rathod ..................... 705/14.54

OTHER PUBLICATIONS

Porter, "An Algorithm for Suffix Stripping," http://tartarus.org/~martin/PorterStemmer/def.txt, 1980, 7 pages.
Lovins, "Development of a Stemming Algorithm," Mechanical Translation and Computational Linguistics, vol. 11, Nos. 1 and 2, Mar. and Jun. 1968, pp. 22-31.
Airio, "Word Normalization and Decompounding in Mono- and Bilingual IR," Information Retrieval 9(3): 249-271, 2006, 19 pages.
Jansen, "Search Log Analysis: What it is, what's been done, how to do it," Library & Information Science Research 28, 2006, http://www.sciencedirect.com/, pp. 407-432.

\* cited by examiner

SOCIALIZING VIA SEARCH

BACKGROUND

1. Field

The subject matter disclosed herein relates generally to searching.

2. Information

Information in the form of electronic signals or information continues to be generated or otherwise identified, collected, stored, shared or processed. Databases or other like repositories of stored information in the form of signals are common place, as are related communication networks or computing resources that may provide access to information. As one example, the World Wide Web provided by the Internet continues to grow with seemingly continual addition of information.

Computing resources may enable users to access a wide variety of stored signal information in the form of media content, including, without limitation, text documents, images, video, or audio, to name just a few examples. To provide access to stored information, tools or services, such as search engines, for example, have been provided which allow for relatively large amounts of stored information to be searched in a reasonable period of time. However, with available stored information continuing to increase, there is a continuing need for effective searching capabilities.

BRIEF DESCRIPTION OF DRAWINGS

Claimed subject matter is particularly pointed out and distinctly claimed in the concluding portion of the specification. However, both as to organization or method of operation, together with objects, features, or advantages thereof, it may be better understood by reference to the following detailed description if read with the accompanying drawings in which:

DETAILED DESCRIPTION

Figure 1:
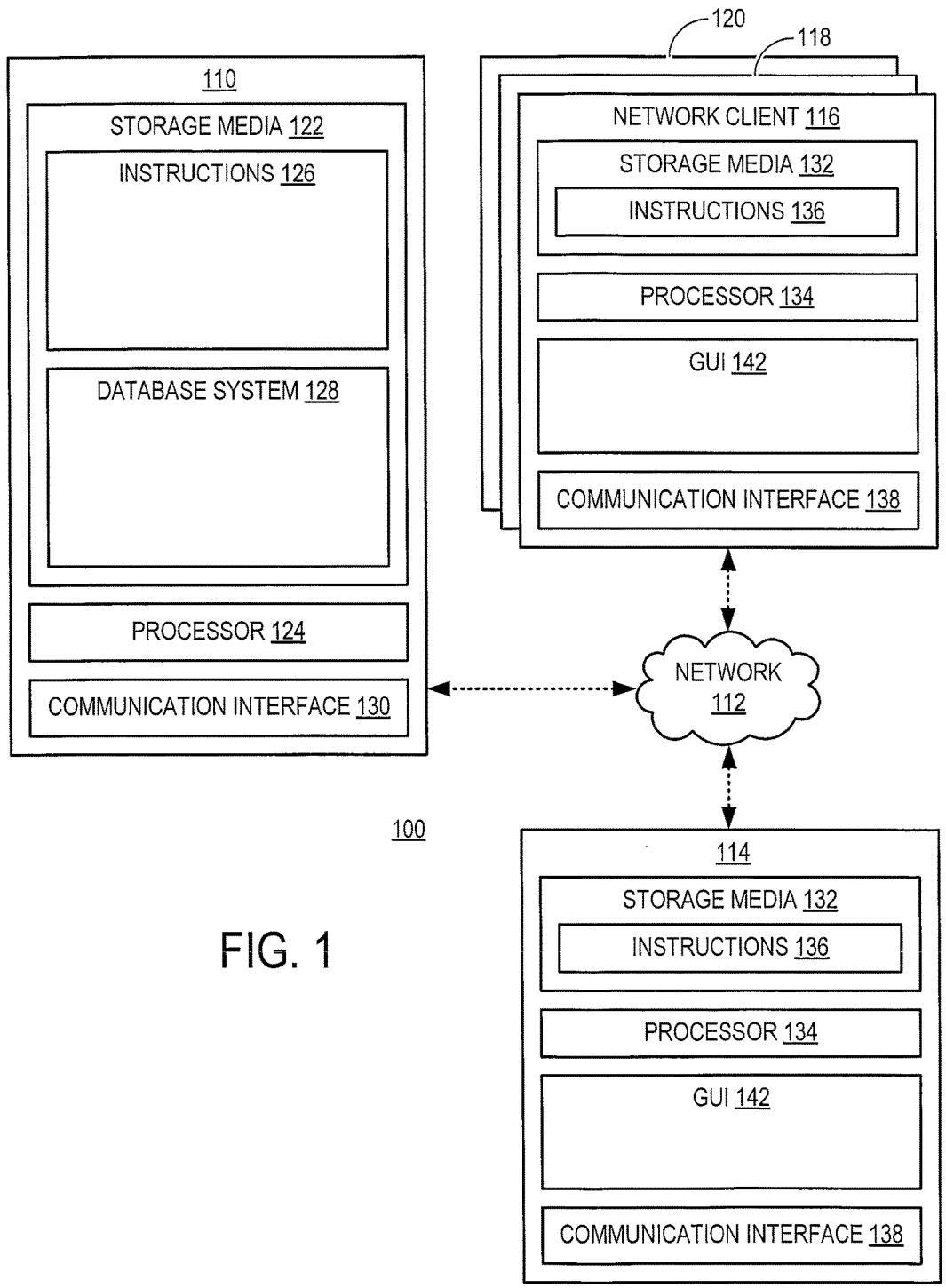
FIG. 1 is a schematic block diagram of an example computing environment according to one implementation.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and" and "or" as used herein may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Some portions of the detailed description are presented in terms of algorithms or symbolic representations of operations on binary digital signals stored within a memory of a specific apparatus or special purpose computing device or platform. In the context of this particular disclosure, the term specific apparatus, special purpose computing device, or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It is further recognized that all or part of the various devices or networks described herein, or the processes, methods, or operations as further described herein, may be implemented using or otherwise include hardware, firmware, software, or any combination thereof, although to be clear, this is not intended to refer to software per se, which may constitute an abstract idea.

It has proven convenient at times, principally for reasons of common usage, to refer to signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the disclosed subject matter, it will be appreciated that throughout this specification discussions utilizing terms such as "processing," "computing," "calculating," "determining", "performing", "identifying", "obtaining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

For some search queries, such as subjective search queries, there may not be suitable follow-up search queries to suggest to a user using an automated process. Furthermore, some users may abandon search engine use after a relatively short period of use or after "clicking" a few links in returned search results at least in part because the results do not appear close to the information they are seeking.

Likewise, communications among users via discussion groups or social media related communications, such as via the Internet, for example, appears to be increasing in popularity. Social communication paradigms supported by the Internet, such as, for example, on-line social networks or web-based personalized virtual communities continue to evolve. Continued advancements in information technology, communications, mobile applications, etc. help to bring on-line social networking. Social networking is gradually becoming more widespread.

Accordingly, implementations of methods, apparatuses, or systems are disclosed to facilitate search related communications between two or more users of a search engine. Search related communications may include electronic discussions between two users or more users, such as a group of users, of respective special purpose computing devices, for example, regarding one or many search topics, for example. As one example, without limitation, users may be communicating via respective network clients, although, of course, claimed subject matter is not limited in scope to network clients.

Benefits of facilitating a communication exchange among users who may be searching for similar or related information are currently unrecognized, but potentially significant. Likewise, it may be difficult to offer similar benefits through search algorithm advancement. In effect, benefits of human creativity, intelligence, problem solving ability, experience or subject expertise may potentially be leveraged in a search environment shared by multiple users or participants. However, to facilitate a communication exchange among users who may be searching for similar or related information nonetheless has technical hurdles or problems to be addressed, such as, appropriate user matching, timeliness, privacy concerns, and user participation reluctance, to name only a few.

In at least one example implementation, users may interact with other users conducting similar or related searches to discuss potential follow-up search queries, obtain search query suggestions, or obtain search results. For example, in at least one embodiment or implementation, without limitation, one or more suggested search queries may be provided, for example, by a special purpose computing device or system, based, at least in part, on keywords obtained by processing of communications between two or more users. Suggested search queries may aid in obtaining search results, for example. However, claimed subject matter is not limited in scope to a particular example implementation Electronic communications or electronic discussions may be implemented through any one of a host of various forms including, for example, via text, audio, video, or other suitable exchange of electronic signals or electronic information. Likewise, electronic communications or electronic discussions may be implemented through any one of a host of various special purpose computing devices, including, for example, a laptop, a smart phone, or a personal digital assistant, to name only a few, as described in more detail. Also as described in more detail, electronic communications may aid users to formulate search queries or obtain search results.

In at least one implementation, a special purpose computing device may be identified and matched for communication with one or more other special purpose computing devices. For example, without limitation, one or more aspects or parameters of respective search queries may comprise a basis at least in part for identifying and matching respective users. For example, one or more search queries received from a variety of users may be processed to identify one or more search queries in which one or more parameters or aspects overlap with or have at least some commonality with one or more other users' search queries. For example, in at least one embodiment, a special purpose computing device from which a search query has been received may be matched with another special purpose computing device to facilitate communication between users of respective special purpose computing devices, although, of course, claimed subject matter is not necessarily limited in this respect.

FIG. 1 is a schematic block diagram of an example computing environment 100 according to one implementation. As illustrated by FIG. 1, example computing environment 100 may include special purpose computing devices or systems, such as 110, 114, 116, 118 or 120. Special purpose computing devices or systems, such as 110, 114, 116, 118 or 120, may, for example, comprise a desktop computer, a laptop computer, a handheld computer, a mobile computing device, or other suitable media device(s) that include computing capabilities along with the device(s), such as, for example, a camera device, a telecommunications device, a media player device, a personal digital assistant, etc.

For example and without limitation, device or system 110 may comprise a server system. Likewise, one or more devices or systems, such as 114, 116, 118 or 120 may, for example, but without limitation, comprise a network client. Likewise, in at least one embodiment, devices or systems, such as 110, 114, 116, 118 or 120, may communicate via a network 112. For example, and without limitation, network 112 may comprise one or more local area networks, one or more wide area networks, one or more cell phone networks, one or more wireline telephone networks, one or more personal area networks, the Internet or any combination thereof, just to name a few possible examples. Likewise, it is, of course, understood, that an implementation or embodiment is not limited in scope to a particular number of special purpose computing devices. Example computing environment 100 may include one, two, three, tens, hundreds, thousands, millions, or more special purpose computing devices, for example Accordingly, devices or systems 114, 116, 118, or 120 may also include storage media, such as, for example, 122 or 132, and one or more processors, such as, for example, 124 or 134. Likewise, storage media, such as 122 or 132, for example, may include instructions stored thereon, such as 126 or 136, for example, that may be executable, for example, by one or more processors to perform one or more operations, processes, or methods, including those, for example, described in more detail hereinafter. As one example, instructions 126 or 136 may comprise a web browser application or other suitable program, software, or firmware, etc. to retrieve, load, or process signal information (e.g., electronic documents or the like), such as may be communicated between special purpose computing devices, for example. Devices or systems 114, 116, 118, or 120 may further include a communication interface, such as 103 or 138, for example, to facilitate wired or wireless communication via network 112, for example, by transmitting or receiving signal information.

Systems or devices 114, 116, 118, or 120 may include one or more peripherals, such as, for example, one or more input devices or output devices. Non-limiting examples of input devices include a keyboard, a touch-screen, a touch-pad, a microphone, a camera, or a pointing device, such as a controller or a mouse, etc. Non-limiting examples of output devices include an audio speaker, a tactile feedback device, a display, a touch-screen, etc. In at least one implementation, devices or systems 114, 116, 118, or 120 may also include a graphical user interface (GUI) application or other suitable program, software, or firmware, etc., such as 142. As one example, execution of a GUI 142 may result in display of icons or other small pictographs, such as in the form of bit maps, for example, which may be capable of being viewed via an output device, although this is merely one illustrative example.

Again, implementation or example 100 is provided for purposes of illustration and claimed subject matter is not limited in scope to implementation or example 100. For example, server system 110 may comprise one or more computing platforms such as, for example, one or more network servers. As alluded to previously, server system 110 may include storage media 122 and one or more processors, such as example processor 124. Also alluded to previously, storage media 122 may include instructions 126 stored thereon that may be executable, for example, by one or more processors, such as, for example, processor 124, to perform one or more operations, processes, or methods, including, for example, operations, processes, or methods described in more detail hereinafter. Storage media 122 may further include an electronic repository to store signal information, such as database system 128, for example. Likewise, one or more processors of system 110, such as, for example, processor 124, may be capable of writing signal information to or reading signal information from storage media 122, for example. Likewise, as also alluded to above, server system 110 may further include a communication interface 130 to facilitate wired or wireless communication via network 112, such as transmitting or receiving electronic signal information, for example.

For example, a special purpose computing device may process search queries received from one or more of devices 114, 116, 118, or 120, for example. In this context, a search engine, such as a web search engine, for example, refers to software or code, such as implemented by a special purpose computing device or system, to search accessible information that may be stored on storage medium. Storage mediums searchable by a search engine may be accessible via direct or indirect electrical connection or coupling, such as via a wire line or wireless network, including, for example, a local area network, a wide area network, or the world wide web, to provide a few example. Search results, sometimes referred to as hits, may generally be presented in a list of results that may appear in a user's browser that is executing on a special purpose computing device or system that the user employed to enter the search query. A search query, such as a web search query, for example, refers to a query that a user may enter into search engine to seek particular information that may be included among accessible stored information stored. Search queries although typically provided in a particular language tend to be unstructured. A search engine may be implemented to process search queries, such as, for example, in connection with a search index corresponding to search results for a given search query. Likewise, in at least one implementation, a search log of search results from search queries may be employed. A log typically refers to a file of communications, such as transactions, between a system, such as server system 110, as a non-limiting example, and users in communication with the system. Typically, logs, such as transaction logs, are electronically recorded interactions between on-line information retrieval systems and users who search for information that may be found on those systems.

For example, if a special purpose computing device were to submit a search query, in at least one embodiment, a search log may be updated to include or indicate, for example, one or more search terms of the search query and the corresponding special purpose computing device. Although claimed subject matter is not limited in scope in this respect, terms, such as click log, search log, search query log and session log may be employed in connection with various embodiments. Therefore, terminology as follows is employed herein: click log refers to a log for tracking hyperlinks a user has 'clicked through'; search log refers to a log for tracking searches conducted by a user, irrespective of having clicked through particular hyperlinks; search query log is another term for search log; and session log refers to a log for tracking a user's search or clicks during a session. A session, for example, may comprise a series of interactions, for example, in which a client device and a server device, for example, may be in contact but without significantly long interruptions or breaks in communications. In addition or alternatively, a search session may be related to user engagement, such as user interactions recorded within a window of X minutes, for example, or interactions until a user "appears" or is perceived to have received a satisfactory result.

In at least one implementation, processing or filtering of search queries may take place. For example, in at least one implementation, processing or filtering may be based, at least in part, on one or more parameters or aspects of search queries submitted from corresponding special purpose computing devices. For example, separate search queries from submitted from corresponding special purpose computing devices may be identified as being related.

Likewise, in at least one implementation, communication between computing devices or systems may be facilitated by initiating a communication link between computing devices or systems identified as submitting related queries, for example, as a result of search query processing. In at least one embodiment, computing devices or systems may communication via bi-directional signals, for example. As indicated previously, communication signals may comprise any one of a host of types of content, including, for example, text messages or content (e.g., instant messages, email, etc.), audio messages or content (e.g., voice), image content, video content, multi-media content, etc.

In at least one embodiment or implementation, for example, an assistance layer of a search engine may allow users to socialize or group together to engage in search related communications, as described in more detail below. For example, in at least one embodiment or implementation, again, described in more detail below, after posing a query, for example, users may be provided an opportunity to join a discussion related to the particular query.

Figure 2:
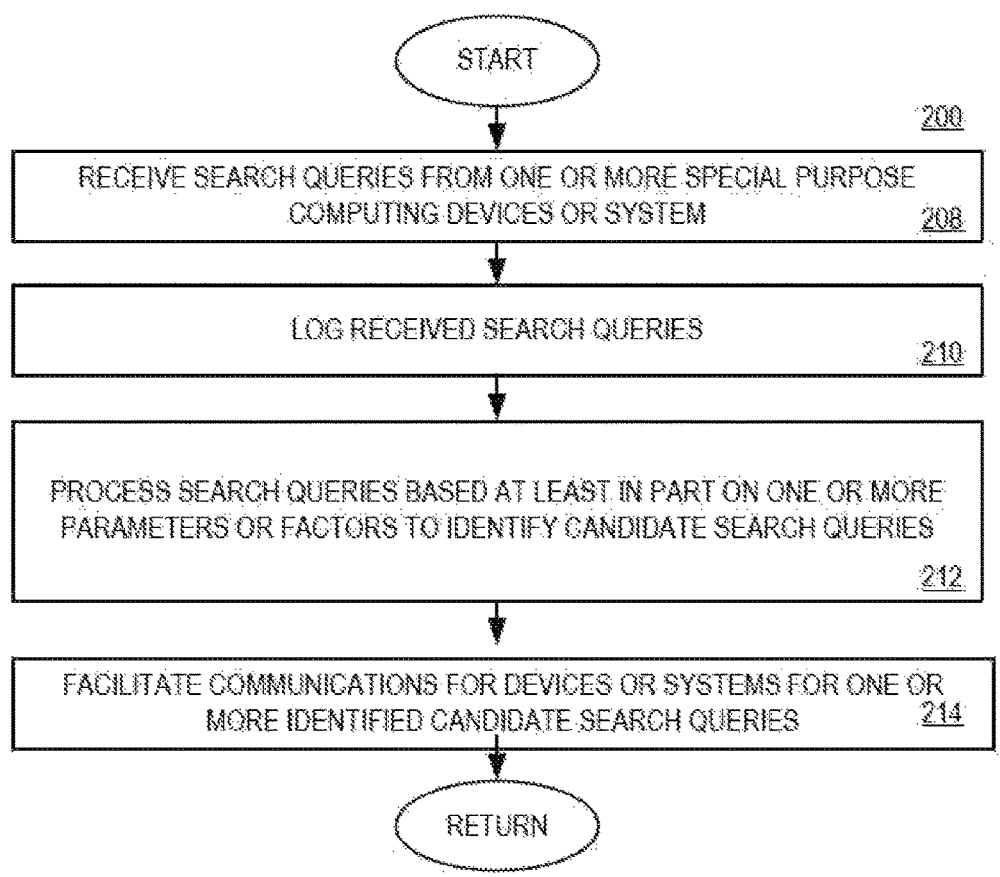
FIG. 2 is a flow diagram illustrating an example process to facilitate search related communications according to one implementation.

FIG. 2 is a flow diagram illustrating an example process 200 to facilitate search related communications according to one implementation. At 208, one or more search queries may be received or may have been submitted or initiated. For example, a special purpose computing device, such as 114, 116, 118 or 120, for example, may submit queries. Likewise, a server system, such as server system 110, for example, may receive search queries, such as via network 112, for example.

At 210, search queries received (e.g., operation 208) may be logged, such as at a database system, for example. In this particular context, logging refers to tracking, such as by storing, an indication of one or more terms (e.g., keywords) included in the search query along with an indication of a special purpose computing device origination or source of the query. At 212, one or more search queries logged may be processed or filtered based, at least in part, on one or more parameters to identify candidate search queries that may be related or overlap in subject matter in one or more aspects. For example, as a result of identifying a candidate search query in 212, at 214, search related communications may be facilitated in an embodiment, for example, by inviting a special purpose computing device or system corresponding to the candidate query to join a discussion group related to subject matter of the candidate query. However, if no discussion group related to subject matter is on-going, for example, but, at 214, two or more search queries are identified to be related or overlap in subject matter in one or more aspects, communication between special purpose devices corresponding to the identified may be facilitated. For example, one or more communication links to facilitate communication between corresponding communications devices may be initiated, as described in more detail below. As shall be described, a server or server system may be employed to initiate a discussion. Typically, search queries go to a main server anyway. Therefore, it may be convenient to employ a main server to likewise decide which users join which chat conversations. Of course, after a connection and a chat has been initiated, the users could potentially chat in a peer-to-peer fashion in at least one implementation. However, in an implementation, a server may also suggest other searches/entities. This feature may be implemented more easily by being included in a chat conversation in real-time and suggesting other searches/entities.

Although claimed subject matter is not limited in scope in this respect, below at least one possible implementation is provided as an illustrative example of an approach to identifying two or more candidate search queries for which facilitating communication between corresponding computing devices or systems may be desirable or useful. For example, one or more search queries received from a variety of users may be processed to identify one or more search queries in which one or more parameters or aspects overlap with or have at least some commonality with one or more other search queries. Of course, as discussed below in more detail for at least one implementation, there may be any one of a number of potential aspects or parameters to consider. A range of parameters or factors may exist for processing or evaluation that may tend to indicate that facilitating communication between corresponding computing devices or systems may be desirable or useful. Claimed subject matter is not limited in scope to parameters or aspects discussed below as an illustrative example. Of course, over a period of time, as experience is gained in search related communications, additional parameters or factors to consider may come to light. It is intended that claimed subject matter cover such additional parameters and factors. Without limitation, useful parameters or factors may later be found to be: topics raised in follow on communication exchanges for similar searches performed; links that a user clicked more frequently in previous searches; identification of "entities" (e.g., organizations, companies, etc.) mentioned in follow on communication exchanges and showing corresponding entity pages; or specific link recommendations proposed during follow on communication exchanges, as examples.

In at least one implementation, without limitation, two or more search queries may be processed in a number of ways or along a number of parameters. For example, given two search queries, in at least one embodiment, the two search queries may, in effect, be compared and the comparison may be evaluated or measured along a host of parameters or aspects. Likewise, signal sample values may, for example, be employed as a measure or score along a particular parameter, for example, of a search query or a comparison of search queries. Likewise, different signal sample values along different particular parameters or aspects may be factored differently in terms of scoring, for example. It is noted that comparison does not necessarily need to be pair wise between queries. Rather, although claimed subject matter is not limited in scope in this respect, for at least one implement, a comparison is made between a search query, and existing on-going search related communications. So if a query is similar to queries for an existing on-going search related communications, a user may be added to that conversation.

As explained in more detail below, for at least one particular implementation, queries may be evaluated in terms of query classification or query relatedness. In one example, query relatedness may refer to queries meeting identified or selected thresholds for subject matter relatedness and time proximity. Thus, for this example, parameters for measuring or scoring two search queries as being related may comprise, without limitation: subject matter relatedness and time proximity. In this context, queries may exhibit subject matter relatedness if one or more measurable or scorable parameters or aspects of the queries overlap with or have at least some commonality. Likewise, query classification may refer to categorizing or classifying queries having common properties. As example, an information query may refer to a query that may cover a broad topic. In contrast, a navigation query may refer to a query seeking a single or small number of websites or web pages. Of course, these are merely two illustrative examples of query classifications and are not intended to limit the scope of claimed subject matter. In at least one particular embodiment, discussion-orientation may comprise a search query classification parameter to be scored or measured. In this context, a search query may be classified as discussion-oriented if, given the query, a user may benefit from user interaction regarding the subject matter of the query. Of course, again, a host of other potential parameters or aspects may be measured or scored and claimed subject is not limited in scope to any particular parameters or aspects.

For example, a value to measure or score subject matter relatedness and a value or score to measure time proximity may be calculated, as described in more detail below. These signal sample values may likewise be respectively weighed and combined to obtain a total signal sample value $V_t$ for a search query in at least one implementation. Respective weighting factors $W_1$, $W_2$, etc. having suitable values to capture a trade off may be employed in at least one implementation. For example, but without limitation, a supervised model (e.g., linear regression model or Support Vector Machine, for example) may be employed to select weights over a training set.

Processing of search results to identify candidate search queries may comprise selecting one or more search results having more extreme total values $V_t$ in at least one implementation. However, in other implementations, one or more parameters or factors, such as subject matter relatedness or time proximity, for example, may be evaluated on another basis. However, continuing with the example or approach suggested above, for at least one implementation, to identify a subject matter relatedness signal sample value or score $V_1$ in a comparison of search queries, a search log, for example, may be referenced, as explained in more detail below. For example, a first search query may be considered to have perfect or nearly perfect query relatedness to a second search query if two queries being compared are identical. In this context, two queries are considered identical if they are the same after applying standard natural-language transformations, such as term stemming (e.g., to identify root forms of terms). Typically, grammar-specific lexical rules, dictionaries or resources, such as WordNet, may be employed. For example, existing methods such as Porter Stemmer may be applied.

In situations involving identical queries, a time proximity threshold may be an appropriate parameter or factor to apply to identify candidate queries. However, search queries having perfect query relatedness may not necessarily be found in some examples.

Furthermore, a user may benefit from communications with other users even if respective search queries are not 'identical.' However, in situations in which respective queries are not identical, a measure or scoring of sufficient subject matter relatedness may be appropriate.

For example, in at least one implementation, subject matter relatedness may be scored or measured in at least one embodiment by computing a subject matter relatedness sample signal value or score $V_1$ between a first search query (Q1) and a second search query (Q2). A subject matter relatedness value $V_1$ between Q1 and Q2 may, however, be based, at least in part, on one or more other factors or parameters. Example factors, without limitation, may include a text-relatedness factor or parameter measured as a signal sample value $R_1$, a click-relatedness factor or parameter measured as a signal sample value $R_2$, a result-relatedness factor or parameter measured as a signal sample value $R_2$, and a reformulation-relatedness factor or parameter measured as a signal sample value $R_4$. The terms text-relatedness, click-relatedness, result-relatedness and reformulation-relatedness refer to, respectively, queries being related in terms of text; queries being related in terms of users clicking through to common locations or URLs; queries being related in terms of search results produced; or queries being related in that their reformulations are related in terms of text, click or result. Approaches for calculating these parameters or factors are discussed in more detail below. Of course, claimed subject matter is not limited in scope to these particular factors or to this particular combination. Any of a host of factors for scoring may be employed in other implementations. Likewise, as discussed previously, different signal sample values along different particular parameters or aspects may be factored differently in terms of scoring, for example, using respective weighting factors $W_5$, $W_6$, $W_7$, $W_8$ etc., again, for example, to reflect potential tradeoffs. Again, for example, but without limitation, a supervised model (e.g., linear regression model or Support Vector Machine, for example) may be employed to select weights over a training set. As one example, a text-relatedness parameter or factor may be identified by applying natural-language transformations such synonyms, term stemming (e.g., to identify root forms of terms), etc. to one or more search terms of Q1 and Q2. Examples, without limitation, of articles related to this subject include: Julie Beth Lovins, "Development of a stemming algorithm," appearing in Mechanical Translation and Computational Linguistics (1968); and Eija Airio, "Word normalization and decompounding in mono- and bilingual IR" appearing in Information Retrieval (2006).

In at least one implementation, a first search query may be considered to satisfy a threshold level of text relatedness to a second search query even if some or no search terms are identical. For example, search queries "things to do in the bay area" and "bay area day trips" may be considered related queries having a relative high relatedness for at least one implementation. Likewise, in at least one implementation, a first search query may be considered to satisfy a threshold level of text relatedness to a second search query if root forms of one or more search terms are identical or synonymous. For example, a search term "running" may be evaluated as comprising a root form "run" for purposes of comparing search queries.

In at least one implementation, click-relatedness parameter or factor may be identified from click-logs. Click logs (also referred to as "click-through") may track for a query links that were clicked by a user among those presented by a search engine. For example, by determining how frequently (e.g., in the past) search queries Q1 and Q2 have resulted in users navigating (e.g., clicking through) to identical network locations (e.g., electronic documents) via respective search results returned responsive to search queries Q1 and Q2. Frequency of which search queries Q1 and Q2 have resulted in users navigating to identical network locations (e.g., universal resource locators (URL(s)) may, for example, typically be expressed as an increasing function of a click-relatedness parameter or factor. For example, if users navigate to identical documents responsive to search queries Q1 and Q2 more frequently, typically a higher click-relatedness parameter or factor may result.

In at least one implementation, a result-relatedness parameter or factor may be determined, for example, based at least in part on a tf-idf (term frequency-inverse document frequency) similarity of a set of top-K search results on posing Q1 and Q2 to a particular search engine, for example, where K comprises a positive integer value. A frequency measure, such as tf-idf, may comprise a statistical measure of relevance for a given term to an electronic document in a collection. Relevance may typically comprise, for example, an increasing function of a number of times a term appears in a document in a collection, but may be offset by a frequency of the term in the collection. In at least one embodiment, a reformulation-relatedness parameter or factor may be identified by determining reformulations of search queries Q1 and Q2 from past search-logs, such as search engine logs that may track user interactions (e.g., query, clicked URLs, etc.) and recursively considering one or more of a text relatedness parameter, a click-relatedness parameter, a result relatedness parameter, etc. for reformulations. Query reformulations, for example, may comprise pairs of queries where search engine users may refine or alter their original or initial queries to better represent their search goals. Reformulations may be mined, for example, from search user query logs by focusing on user sessions and considering refinements of queries within a session as candidate query reformulations. Statistical measures such as co-occurrence frequency or point-wise mutual information (PMI) may likewise be applied to identify more reliable reformulations.

In at least one implementation, processing search queries received or submitted may be based, at least in part, on time proximity (e.g., represented by a signal sample value corresponding to a time proximity parameter or factor). For example, respective times at which search queries may be received or submitted may be a factor for evaluation or scoring. For example, a time proximity threshold may be implemented so that search queries that are more proximate in time than the time proximity threshold are more likely to be considered as candidate queries to be identified. Accordingly, a time proximity of two search queries may be expressed as a decreasing function of a time proximity signal sample value, in at least some examples, such that more time proximate search queries have higher time proximity signal samples values than less time proximate search queries.

Furthermore, in at least one implementation, a search query may be classified as discussion oriented based at least in part on being evaluated or scored in terms of discussion-orientation. As one example, a search query may be identified as a discussion-oriented query if the search query may be considered argumentative, debatable, or subjective such that it may benefit from communication between two or more users. For example, a search query such as "things to do in the bay area" or "best vacation destination" may be identified as a discussion-oriented query. However, a more objective search query such as proper name (e.g., "Yahoo" or "CNN") may not be identified as a discussion-oriented query in at least some implementations, for example.

To score or measure discussion-orientation, in at least one implementation, for example, a search query log may be referenced or processed to construct a click vector for a given search query, for example. A click vector may comprise one or more search results (e.g., one or more uniform resource locators (URL)s) that were returned for a given search query that were also selected (e.g., clicked) by one or more users. Queries do not need to be identical or related. For example, one may mine and discover related queries that were not known previously, for example, by applying similarity of click vectors. A weight associated with a search result (e.g., URL) for a given search query may be assigned to that search result based, at least in part, on a frequency at which that search result was selected (e.g., clicked) by one or more users.

A search query may be identified as a query scored relatively low for discussion-orientation if, for example, a click vector comprises a single entry for a single search result. In practice, for example, one may expect a query to be scored relatively low for discussion orientation if a relatively small number of entries for a relatively small number of search results were selected by one or more users for a given search query.

In at least one implementation, a signal sample value or score $V_4$ for discussion orientation may comprise a click-entropy value computed using a click vector. Click-entropy is computed much like in communication or information theory. See, for example, Jaynes, E. T., "Information Theory and Statistical Mechanics" appearing in Physical Review (May, 1957). A click-entropy value, for example, may comprise a measure of a degree of randomness (e.g., a level of diffusivity) of a click vector. A search query having a click-entropy that is greater than a threshold value may be employed, for example.

In at least one implementation, search queries received or submitted may likewise be evaluated for language commonality. For example, search queries in distinctly different languages, such as English, French, Japanese, etc., typically may not be viewed as related unless translations to a common language were first applied.

Figure 3:
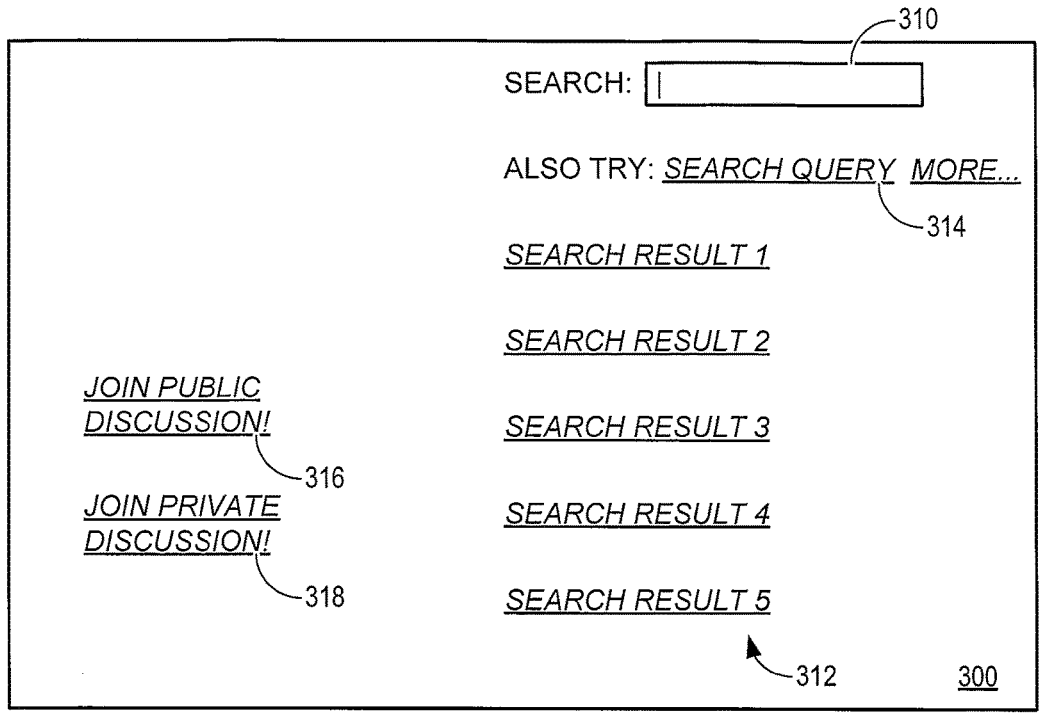
FIG. 3 is a diagram depicting an example graphical user interface according to one implementation.

Returning to FIG. 2, as mentioned previously, at 214, communication may be facilitated (e.g., a communication link may be initiated). In at least one implementation, facilitating communication by initiating a communication link may comprise, as illustrated in FIG. 3 by reference numerals 316 or 318, for example, providing a link on a search results page "join public discussion" or "join private discussion." Of course, this is merely an illustrative example and claimed subject matter is not limited in scope in this respect. Any one of a number of techniques or approaches to initiate a communication link is possible and claimed subject matter is not limited in scope to any particular technique or approach.

For example, without limitation, a communication link may be initiated between network clients by a server system. In at least one implementation, facilitating communication between computing devices or systems, for example, may comprise facilitating a real-time or live communication. A real-time or live communication may, of course, comprise communication delays that may occur for any one of a number of technical reasons. A first user may, for example, submit a communication via a network client that may be transmitted to another network client of a second user via a server system to encourage real-time communications regarding search query formulations.

In at least one implementation, a length or duration of communication between two or more network clients may be limited. For example, a length of a communication may be limited to N characters, terms, or discussion text entries, where N may comprise a positive integer. As another example, in various ways, duration of communication may be limited to a value of N seconds, minutes, or hours, or other suitable limiting condition. For example, a complete exchange of communications may be limited in time or the time between communication responses may be limited, as examples.

Figure 4:
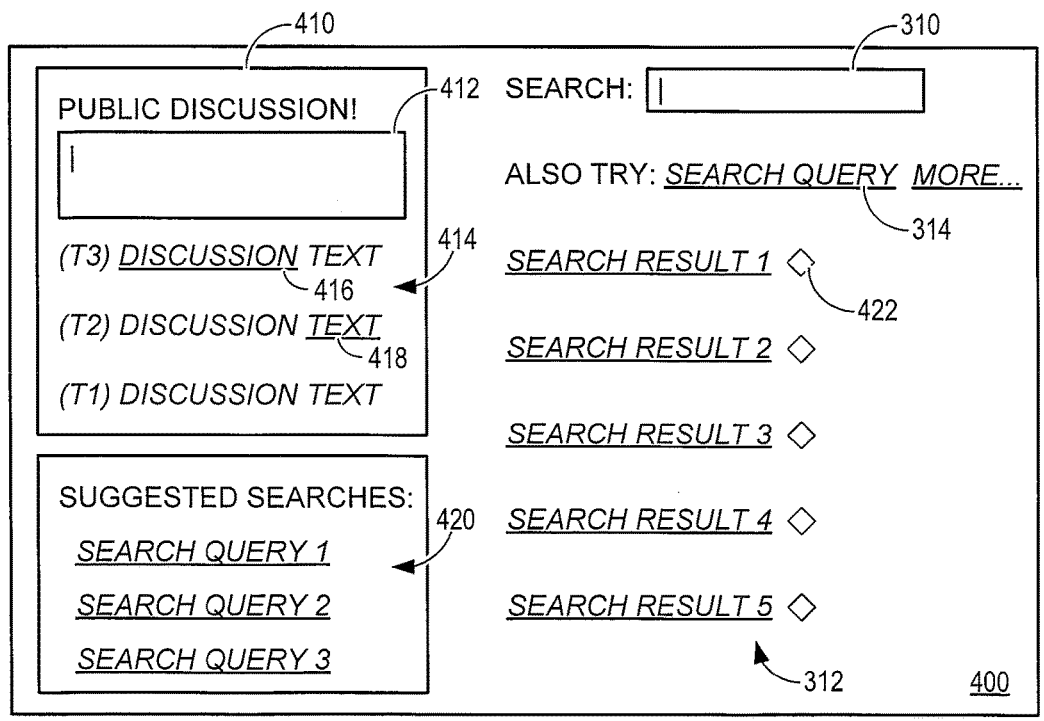
FIG. 4 is a diagram depicting another example graphical user interface according to another implementation.
Figure 5:
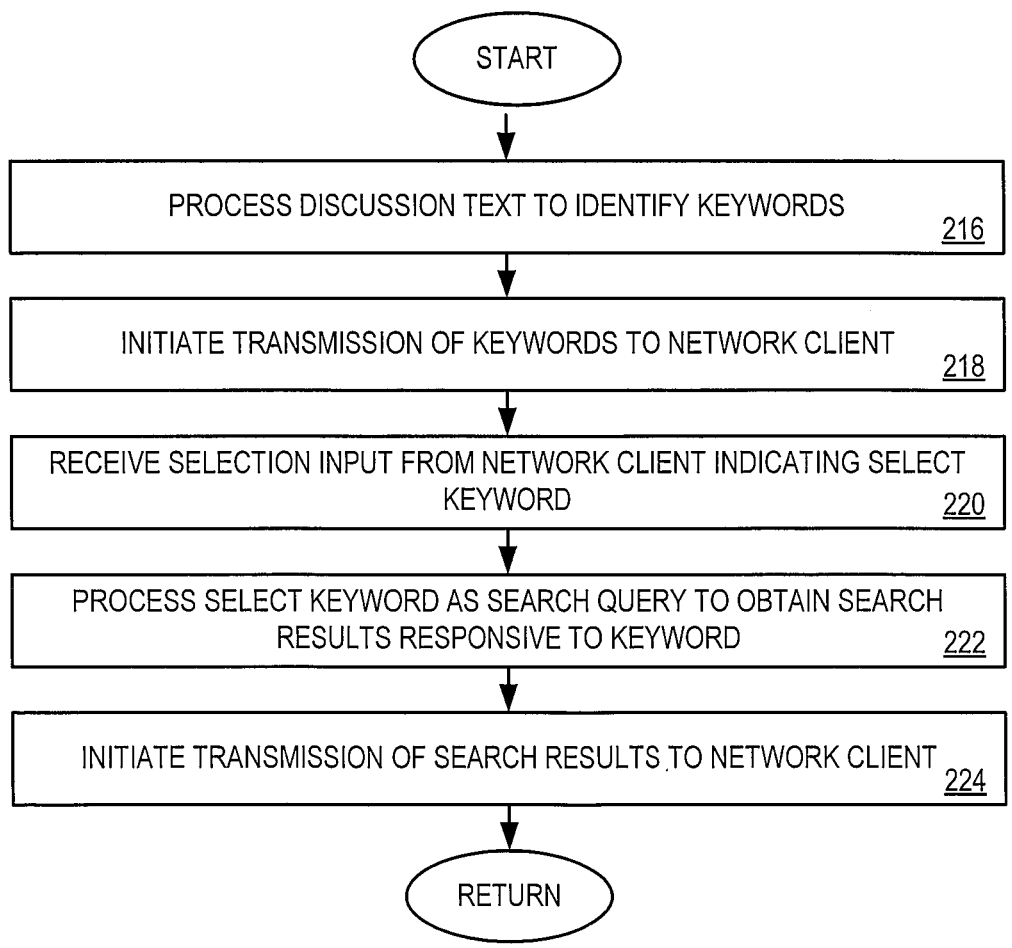
FIG. 5 is a flow diagram illustrating an example process to facilitate search query related communication according to another implementation.

Referring to FIG. 5, in an additional implementation or embodiment, for example, at 216, communications exchanged in connection with search related communications may be processed to identify one or more keywords. For example, suggested search queries that may be provided, such as via a server or server system, for example, in at least one implementation. This is illustrated, for example, at FIG. 4 by reference numeral 410. Of course, claimed subject matter is not limited in scope to providing suggested search queries.

In at least one implementation, at 216, search related communications may comprise processing on-going communications to identify one or more keywords that may comprise one or more suggested search terms of a suggested search query. In addition to keywords, suggested queries may be formulated potentially by identifying interesting text segments, such as entities or query-like segments in follow-on search query communications, for example.

At 218, transmission may be initiated of one or more keywords, such as one or more keywords identified at operation 216. In at least one implementation, electronic communications comprising one or more keywords may be transmitted by a server system to appear on a search page of a user as one or more hyperlinks, such as illustrated in FIG. 4, for example. As one example, keywords may be mirrored to users of a discussion group. At 220, a selection input from a network client indicating the selection of a keyword may be received. 222 may include processing a selected keyword as a search query to obtain search results responsive to a keyword. At 224, transmission of search results to network client may be initiated.

Likewise, in an alternate embodiment, for example, ongoing search related communications may be annotated by referencing a reference library of entities. A library may be constructed using any suitable resource, such as Wikipedia, Wordnet, or other remote resource, for example. Likewise, in at least one implementation, surface-level features of a search query may be employed, such as term capitalization (e.g., Academy of Sciences), which denotes proper entities while ignoring prepositions or other term modifiers. Of course, again, claimed subject matter is not limited in scope in this respect.

Figure 6:
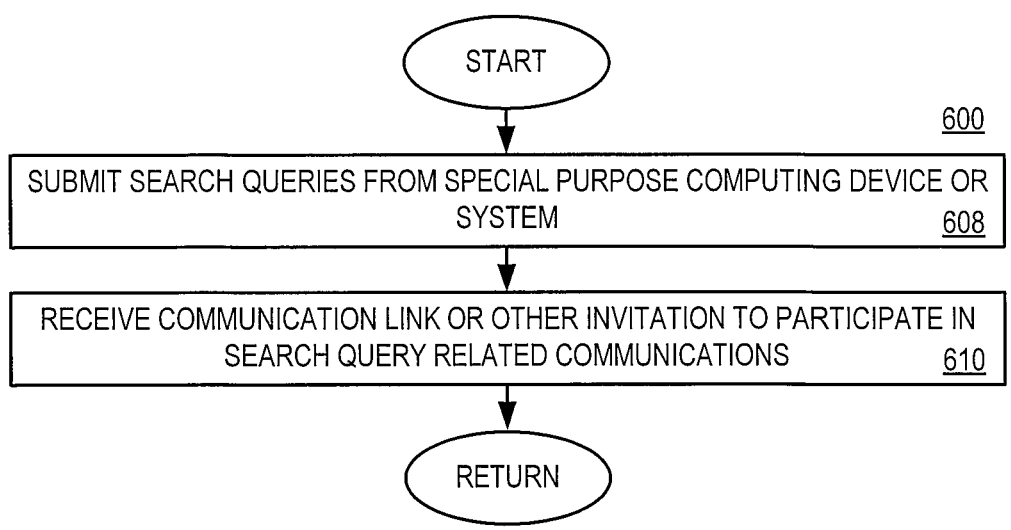
FIG. 6 is a flow diagram illustrating an example process to facilitate search query related communication according to yet another implementation.

FIG. 6 is a flow diagram illustrating another example process 600 to facilitate search related communications according to one implementation. Whereas FIGS. 2 and 5 provide perspectives from a server system, for example, a client system perspective may be illustrated by this implementation or embodiment. For example, at 608, a search query may be submitted from a special purpose computing device or system. Likewise, as illustrated at 610 and described in more detail below, a communication link or other invitation may be received to participate in search related communications, such as a discussion group, for example, FIG. 3 is a diagram depicting an example graphical user interface (GUI) 300 according to one implementation. GUI 300 may be presented, for example, via a display, as previously described. GUI 300 may comprise a search field 310 to receive one or more search terms for enabling a user to submit or initiate a search query. Search queries received via a search field, such as search field 310, may be transmitted to a server system, such as server system 110, for processing. GUI 300 may comprise one or more search results 312 that may be returned by a server system, such as server system 110, responsive to a search query received via search field 310. As mentioned previously, GUI 300 may comprise one or more suggested search queries 314. Likewise, a user may initiate a follow-up search query by selecting one or more of suggested search queries 314.

As mentioned previously, GUI 300 may comprise one or more hyperlinks 316 and 318 to enable a user to initiate discussion communication link with one or more other users via a discussion group, for example. For example, a server system receiving a communication initiation request as a result of a user selecting a hyperlink may facilitate communication by exchanging search related communications among users via participating computing devices or systems, for example. Of course, claimed subject matter is not limited in scope in this respect. Any one of a number of techniques or approaches may be employed.

In at least one implementation, as illustrated, 316 may comprise a hyperlink or other suitable selector to enable a user to join a public discussion. In this particular example, first selector 316 recites: "Join Public Discussion!" notifying a user that a public discussion may be joined by the user selecting first selector 316. A second selector 318, for example, may comprise a hyperlink to enable a user to join a private discussion. In this particular example, second selector 318 recites: "Join Private Discussion!" notifying a user that a private discussion may be joined by the user selecting second selector 318. Of course, in at least one implementation, communication may be facilitated without employing hyperlinks such as 316 or 318. Therefore, selectors or hyperlinks 316 or 318 may be omitted in alternative embodiments, for example.

Nonetheless, a private discussion may enable a user to restrict communication with one or more other users to a subset of users. For example, a private discussion may enable a user to restrict participation in a discussion group. In particular, users may initiate a "private" discussion wherein specified users, such as those defined via messenger identifiers, email addresses, or other suitable identifier, may be identified for communication. Likewise, a user may be prompted, for example, to provide a list for a private discussion group.

FIG. 4 is a diagram depicting another example GUI 400 according to one implementation. In this particular example, GUI 400 may illustrate a search results page for a user participating in a public discussion group. However, a similar approach may be utilized for a private discussion group, of course. As illustrated in FIG. 4, for at least one implementation, a portion of a search results page 410 may comprise a field 412 to receive a communication submitted by a user may appear on a search results page. A communication may take any one of a number of possible forms and claimed subject matter is not limited in scope to a particular form. For example, a free-form natural language communication may be submitted in at least one implementation. Likewise, 410 may comprise a discussion history 414 of communications from other users participating in a discussion group. In this example, a discussion history may be presented with respective time stamps (e.g., T1, T2, T3, etc.) indicating a time at which a communication was received, for example. Of course, claimed subject matter is not limited in scope to this particular implementation. Again, this example is provided primarily for purposes of illustration.

GUI 400 further depicts how keywords contained in communications may be presented as keyword hyperlinks, for example, as indicated at 416 and 418. Keyword hyperlinks may be selected by a user to initiate a search query for the one or more keywords of the selected keyword hyperlink. In at least one implementation, one or more of search results 312 of GUI 400 may further include a selector 422 (e.g., an icon) for enabling a user to copy and paste a select search result into discussion field 412, enabling a user to more easily communicate search results to another user, for example. GUI 400 may also include suggested searches 420. Again, of course, claimed subject matter is not limited in scope in these respects.

As an example discussion provided via a communication link may comprise the following: User 1: "Any recommendations?" User 2: "During my last visit, I visited the Computer Science Museum. It was great!" User 2: "Also, the Academy of Science should be open to public now." User 1: "Thank you!" A server system, such as 110, may identify suggested search queries. For example, search queries including "Computer Science Museum" or "Academy of Science" may be suggested to the first user or the second user as one or more suggested search queries.

Communication facilitated between two or more users in the context of a search activity may increase the extent to which search assistance is provided to users of a search engine. For many search queries, such as subjective search queries, there may not be suitable follow-up search queries to suggest to a user using an automated process. A crowdsourcing principle may be applied to allow users to discuss their search results or search tasks. Accordingly, search processes may be augmented with human interactions that may provide benefits, such as human experience, creativity, etc. Communication facilitated between two or more users in the context of information searches may reduce abandonment rate among users of a search engine. Furthermore, discussions facilitated between two or more users in the context of information searches may further encourage users to spend more time interpreting and understanding search results.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although claimed subject matter is not limited in scope in this respect, one embodiment may comprise one or more articles, such as a storage medium or storage media, for example, that may have stored thereon instructions executable by a specific or special purpose system or apparatus. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. A method comprising:
processing search queries based at least in part on one or more search query parameters to identify candidate search queries for an exchange of search related communications,
wherein
the identified candidate search queries originate from different computing system sources or from different users, and wherein
the identified candidate search queries are considered argumentative, debatable, or subjective based, at least in part, on the one or more search query parameters comprising click-entropy greater than a threshold value as a measure of discussion-orientation of the identified candidate search queries; and
determining that a query from a user exhibits one or more measurable or scorable parameters overlapping one or more of the identified candidate search queries for existing on-going search related communications based, at least in part, on the frequency of the query from the user and the identified candidate search queries having resulted in users navigating to identical network locations and in response inviting the user to participate in the exchange of the search related communications; and
limiting a length or a duration of the exchange of the search related communications.

2. The method of claim 1, wherein the processing of the search queries includes reformulating the search queries using co-occurrence frequency or point-wise mutual information, or a combination thereof, to increase reliability of the candidate search queries.

3. The method of claim 1, wherein inviting the user to participate in the exchange of the search related communications comprises:
initiating one or more communication links for an exchange of search related communications between respective sources of the identified candidate search queries.

4. The method of claim 3, wherein the initiating one or more communication links for the exchange of the search related communications between the respective sources of the identified candidate search queries comprises initiating one or more communication links for the exchange of search related communications between the respective sources of identified candidate search queries via a discussion group.

5. The method of claim 3, wherein at least one of the one or more communication links comprises a hyperlink.

6. The method of claim 1, and further comprising:
providing suggested follow up queries based at least in part on the exchange of the search related communications.

7. An apparatus comprising:
a computing system having a processor coupled to a memory;
the computing system to process search queries based at least in part on one or more search query parameters to identify candidate search queries for an exchange of search related communications, wherein
the identified candidate search queries to originate from different sources or from different users, and wherein
the identified candidate search queries are considered argumentative, debatable, or subjective based, at least in part, on the one or more search query parameters comprising click-entropy greater than a threshold value as a measure of discussion-orientation of the one or more of the identified candidate search queries; and
the computing system to determine that a query from a user exhibits one or more measurable or scorable parameters overlapping one or more of the identified candidate search queries for existing on-going search related communications based, at least in part, on the frequency of the query from the user and the identified candidate search queries having resulted in users navigating to identical network locations and in response to an invitation to the user to participate in the exchange of search related communications; and the computing system to limit a length or a duration of the exchange of search related communications.

8. The apparatus of claim 7, the computing system further to:

provide suggested follow up queries based at least in part on the exchange of search related communications.

9. The apparatus of claim 7, wherein, the computing system to process the search queries to include reformulating search queries using co-occurrence frequency or point-wise mutual information, or a combination thereof, to increase reliability of the candidate search queries.

10. An non-transitory storage medium, comprising:

the storage medium having stored thereon instructions executable by a computing system having a processor coupled to a memory to:

process search queries to be based at least in part on one or more search query parameters to identify candidate search queries to exchange search related communications, wherein the identified candidate search queries to originate from different sources or different users, and wherein the identified candidate search queries are considered argumentative, debatable, or subjective based, at least in part, on the one or more search query parameters comprising click-entropy greater than a threshold value as a measure of discussion-orientation of the identified candidate search queries; and determine that a query from a user exhibits one or more measurable or scorable parameters overlapping one or more of the identified candidate search queries for existing on-going search related communications based, at least in part, on the frequency of the query from the user and the identified candidate search queries having resulted in users navigating to identical network locations and in response to inviting the user to participate in the exchange of the search related communications; and limit a length or duration of the exchange of the search related communications.

11. The storage medium of claim 10, the instructions to further provide suggested follow up queries based at least in part on the exchange of search related communications.

12. The storage medium of claim 10, wherein, the computing system to process the search queries to include reformulating search queries using co-occurrence frequency or point-wise mutual information, or a combination thereof, to increase reliability of the search queries.

13. An apparatus comprising:

means for processing search queries based at least in part on one or more search query parameters to identify candidate search queries for an exchange of search related communications;

means for originating the identified candidate search queries from different sources or from different users, wherein the identified candidate search queries are considered argumentative, debatable, or subjective based, at least in part, on the one or more search query parameters comprising click-entropy greater than a threshold value as a measure of discussion-orientation of the identified candidate search queries;

means for determining that a query from a user exhibits one or more measurable or scorable parameters overlapping one or more of the identified candidate search queries for existing on-going search related communications based, at least in part, on the frequency of the query from the user and the identified candidate search queries having resulted in users navigating to identical network locations and, in response, for inviting the user to participate in the exchange of search related communications; and means for limiting the length or duration of the exchange of the search related communications.

14. The apparatus of claim 13, and further comprising:

means for providing suggested follow up queries based at least in part on the exchange of the search related communications.

15. The apparatus of claim 13, wherein the means for processing search queries based at least in part on one or more search query parameters to identify candidate search queries for the exchange of search related communications comprises means for processing search queries based at least in part on one or more search query parameters to identify candidate search queries for a real-time exchange of search related communications.

16. The apparatus of claim 13, wherein the candidate search queries to be identified via reformulating the candidate search queries using co-occurrence frequency or point-wise mutual information, or a combination thereof, to increase reliability of the search candidate queries.

17. A method, performed by a client device coupled to a network, comprising:

submitting one or more search queries from a computing device or system;

receiving a communication link inviting the client device coupled to the network to participate in an exchange of search related communications via the communication link based at least in part on one or more search query parameters to identify candidate search queries for an exchange of the search related communications, wherein the receiving to be based, at least in part, on an identified candidate search query being considered argumentative, debatable, or subjective based, at least in part, on the one or more search query parameters comprising click-entropy greater than a threshold value as a measure of discussion-orientation of the identified candidate search query;

determining that a query from the client device coupled to the network exhibits one or more measurable or scorable parameters overlapping one or more of the identify candidate search queries for existing on-going search related communications based, at least in part, on the frequency of the query from a the client device coupled to the network and the identify candidate search query having resulted in users navigating to identical network locations; and limiting a length or duration of the search related communications.

18. The method of claim 17, wherein the communication link comprises a hyperlink.

19. The method of claim 17, wherein, the receiving additionally to be based, at least in part, on a reformulation of the identified candidate search query using co-occurrence frequency or point-wise mutual information, or a combination thereof, to increase reliability of the candidate search queries.

20. A client device coupled to a network, comprising:

a processor coupled to a memory to:

submit one or more search queries from the client device to be identified as candidate search queries for an exchange of search related communications;

receive a communication link to invite the client device coupled to the network to participate via the communication link in an exchange of the search related communications to be based, at least in part, on one or more search query parameters;

wherein the identified candidate search queries are considered argumentative, debatable, or subjective based, at least in part, on the one or more search query parameters to comprising click-entropy greater than a threshold value as a measure of discussion-orientation of the identified candidate search queries; and
and determine that a query from a user exhibits one or more measurable or scorable parameters overlapping the one or more of the identified candidate search queries for existing on-going search related communications based, at least in part, on the frequency of the query from the user and the identified candidate search queries having resulted in users navigating to identical network locations and in response to inviting the user to participate in the exchange of the search related communications; and limit a length or a duration of the exchange of the search related communications.

21. The client device of claim 20, wherein the communication link to comprise a hyperlink.

22. The client device of claim 20, wherein the one or more search query parameters is to be reformulated using co-occurrence frequency or point-wise mutual information, or a combination thereof, to increase reliability of the candidate search queries.

* * * * *